US010938926B2

(12) United States Patent
Bhattacharya et al.

(10) Patent No.: US 10,938,926 B2
(45) Date of Patent: Mar. 2, 2021

(54) USER AND IOT (INTERNET OF THINGS) APPARATUS TRACKING IN A LOG MANAGEMENT SYSTEM

(71) Applicant: Fortinet, Inc., Sunnyvale, CA (US)

(72) Inventors: Partha Bhattacharya, Cupertino, CA (US); Santosh Rao, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 55 days.

(21) Appl. No.: 15/396,403

(22) Filed: Dec. 30, 2016

(65) Prior Publication Data

US 2018/0191848 A1  Jul. 5, 2018

(51) Int. Cl.
| | | |
|---|---|---|
| *G06F 15/173* | (2006.01) | |
| *H04L 29/08* | (2006.01) | |
| *H04L 12/46* | (2006.01) | |
| *H04L 12/26* | (2006.01) | |
| *H04L 29/06* | (2006.01) | |
| *H04W 4/029* | (2018.01) | |
| *H04W 12/12* | (2021.01) | |
| *H04W 12/00* | (2021.01) | |
| *H04L 29/12* | (2006.01) | |
| *H04W 84/12* | (2009.01) | |
| *H04W 4/70* | (2018.01) | |

(52) U.S. Cl.
CPC .......... *H04L 67/22* (2013.01); *H04L 12/4641* (2013.01); *H04L 43/028* (2013.01); *H04L 63/0876* (2013.01); *H04L 63/1425* (2013.01); *H04L 67/12* (2013.01); *H04L 67/18* (2013.01); *H04W 4/029* (2018.02); *H04W 12/00503* (2019.01); *H04W 12/00516* (2019.01); *H04W 12/1206* (2019.01); *H04L 61/2015* (2013.01); *H04W 4/70* (2018.02); *H04W 84/12* (2013.01)

(58) Field of Classification Search
CPC ..... H04L 67/22; H04L 12/4641; H04L 43/08; H04L 67/12; H04L 67/18; H04W 4/029
USPC ........................................ 709/224, 223, 203
See application file for complete search history.

(56) References Cited

U.S. PATENT DOCUMENTS

| 8,504,411 B1 * | 8/2013 | Subasic | ............. G06Q 30/0201 |
| | | | 705/14.41 |
| 9,538,335 B1 * | 1/2017 | Bank | ...................... H04W 4/029 |
| 2010/0279656 A1 * | 11/2010 | Hazzani | ................. G06Q 20/18 |
| | | | 455/411 |
| 2011/0185055 A1 * | 7/2011 | Nappier | ............. H04L 63/1433 |
| | | | 709/224 |
| 2014/0211961 A1 * | 7/2014 | Koch | ..................... G08C 17/02 |
| | | | 381/77 |

(Continued)

*Primary Examiner* — Kaylee J Huang
(74) *Attorney, Agent, or Firm* — Law Office Of Dorian Cartwright; Dorian Cartwright (57) ABSTRACT

Network identity to User Identity and location mapping information can be found in various logs (such as Active Directory logs, DHCP logs, VPN logs, and WLAN authentication logs) and certain files such as router Layer 2 or 3 forwarding tables. For a large organization, this mapping can be dynamic. Accurate user identity and location information is crucial to assessing the security risk associated with a host and take corrective action. This invention discloses a distributed in-memory user database update methodology for keeping track of large scale dynamically updating network to user identity mappings. The technique is further configurable for specific users, specific devices or for specific attributes in the metadata.

12 Claims, 7 Drawing Sheets

(56) References Cited

U.S. PATENT DOCUMENTS

2016/0105801 A1* 4/2016 Wittenberg ........... H04W 4/029
                                                  455/411
2016/0212228 A1* 7/2016 Arkin .................. H04L 63/0263
2017/0213025 A1* 7/2017 Srivastav .............. G06F 21/552
2018/0189467 A1    7/2018 Rao

* cited by examiner

USER AND IOT (INTERNET OF THINGS) APPARATUS TRACKING IN A LOG MANAGEMENT SYSTEM

FIELD OF THE INVENTION

The invention relates generally to computer networking, and more specifically, to identify and track users associated with log events on a computer network.

BACKGROUND

The field of security information and event management (SIEM) is generally concerned with collecting data from networks and networked devices that reflects network activity and/or operation of the network devices, and analyzing the data. For example, a reported event can be triggered when a user logs on to a device, uploads files, or moves between access points.

The so-called Internet of Things (IoT) devices can also trigger log events stored by SIEM systems. Generally, IoT refers to a new paradigm in which a wide range of physical devices that are connected to data networks, either directly or indirectly. In more detail, directly connected physical devices such as laptops and smartphones, and more recently, automobiles and other electronic apparatus, have integrated RF (Radio-Frequency) radios for communications with data networks. Indirectly connected physical devices such as books or animals can have an attached RF tag that is observed by another computer device directly and reported to data networks.

Problematically, different events provide different types of metadata when it comes to identifying who and what sourced the event at a network device. For example, DHCP log events provide IP address and MAC address and host name, but not a user. But an individual user may use a user name for a DHCP logon and a different user name for a logon to a different server or service. Even an IP address is identified for an individual user, a dynamic IP address can change.

Therefore, what is needed is a robust SIEM system to merge various metadata for different events to identify IoT apparatus, and/or users, associated with log events. Further, locations of the identities can be tracked among log events at different times to detect anomalies, such as network security breaches and theft of physical items.

SUMMARY

These shortcomings are addressed by the present disclosure of methods, computer program products, and systems for dynamically allocating reporting rates of log events to a central log service from distributed nodes.

In one embodiment, different metadata is received for different log events, from a plurality of controller nodes. The controller nodes can be geographically-dispersed around the data communication network for proximity to network devices, and the events being reported by the network devices to the plurality of controller nodes. The events can be initiated by actions of a specific IoT apparatus or a specific user.

In another embodiment, the metadata is parsed for each of the reported events to expose part of an identity context. A specific user or IoT apparatus is identified for each of the reported events based on user identity aspects of the identity context. A current location for the specific user or specific IoT apparatus is determined based on user location attributes of the parsed log data.

In yet another embodiment, the determined current user location for the specific user is compared to a trend of previously determined user locations for the specific user stored in relation to previous reported events. Responsive to identifying an anomaly in the current user location relative to the trend of previously determined user locations, a network security action is performed concerning the specific user or the specific IoT apparatus.

Advantageously, log events are leveraged to identify specific users and/or specific IoT apparatus and to track associated locations. The platform enables detection of network security breaches and breaches against physical property.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for tracking users and their devices in a network and in IoT scenario where only partial data is received in the event logs requiring the need to dynamically build context. One of ordinary skill in the art will recognize that many other scenarios are possible, as discussed in more detail below.

Figure 1A:
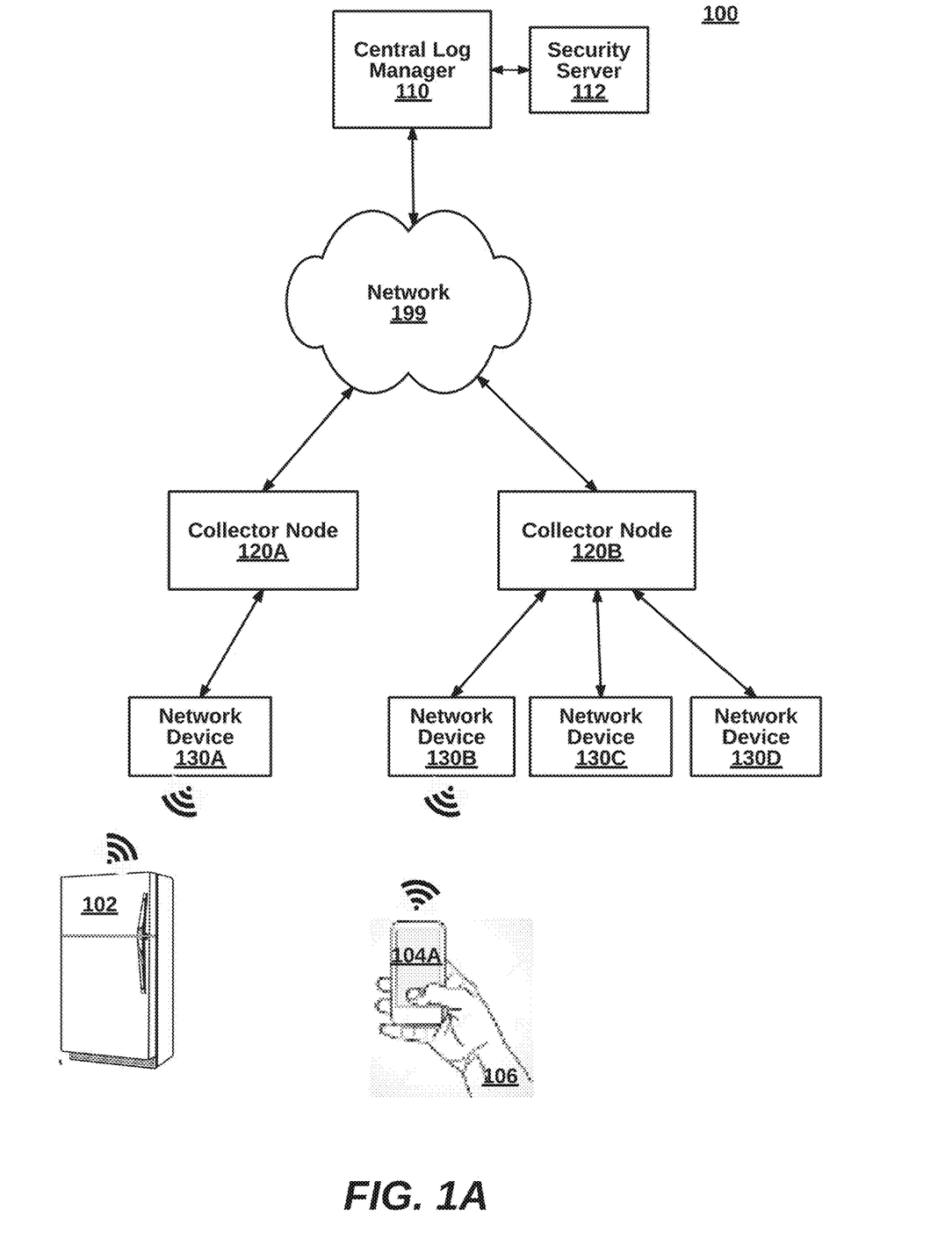
FIGS. 1A-1B are high-level block diagrams illustrating a system to track IoT apparatus and users from reported log events, according to one embodiment.
Figure 1B:
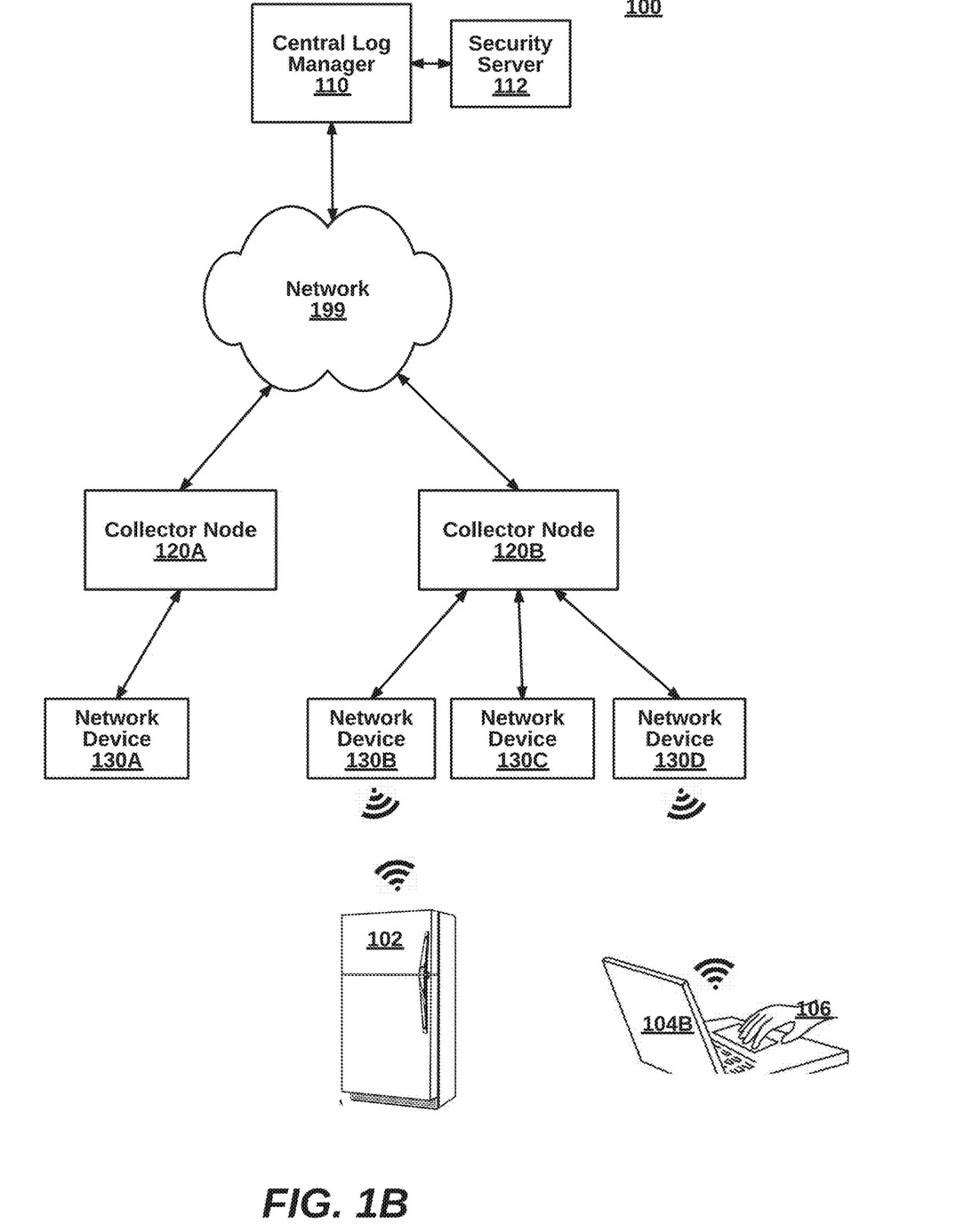
Figure 2:
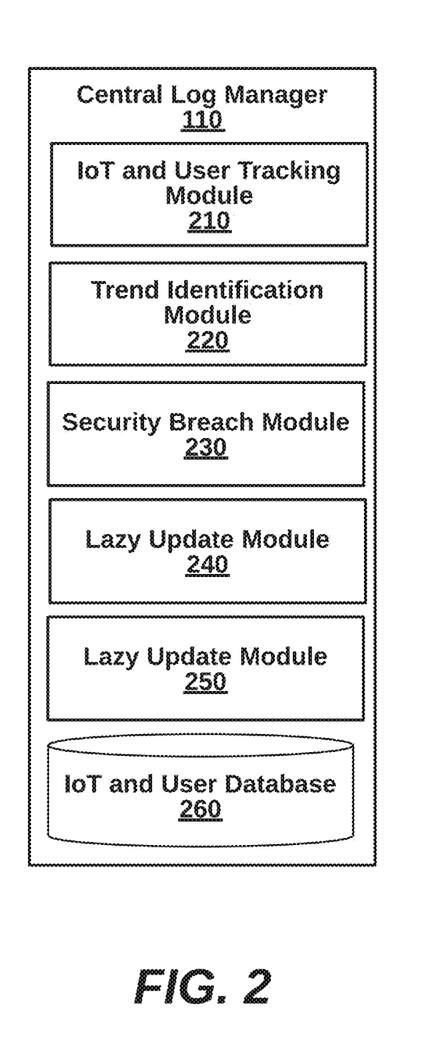
FIGS. 2-3 are more detailed block diagrams illustrating internal components of a central log manager and a collector node from the system of FIGS. 1A and B, according to some embodiments.
Figure 3:
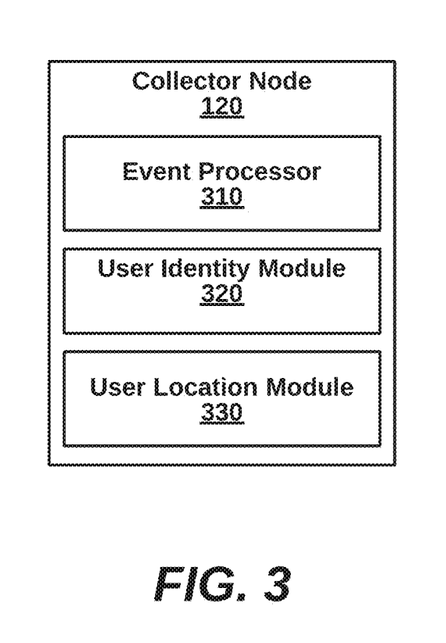

Systems to Dynamically Track Users at Devices in the Network (FIGS. 1-3)

FIG. 1A is a high-level block diagram illustrating a system 100 to track IoT apparatus and users from reported log events, according to one embodiment. The system 100 comprises a central log manager 110 (and options security server 112), collector nodes 120A-B, and network devices 130A-D.

A specific user 106 accesses the network 199 from a smartphone 104A at a location served by the network device 130B in FIG. 1A. At a later point in time in FIG. 1B, the same specific user 106 access the network 199 from a laptop 104B at a different network location, through the network device 130D. The change in device and/or the change in location can be an anomaly leading to a security action by the security sever 112. Additionally, a refrigerator 102 is a specific IoT apparatus that is expected to be stationary and continually access the network 199 at the network device 130A as shown in FIG. 1A. However, as shown in FIG. 1B, the refrigerator 102 has moved to a new location served by the network device 130B. Therefore, the system 100 can identify a potential theft of a physical device if the move is unexpected.

The central log manager 110 generally analyzes and stores event records received from collection nodes 120A-B. In one embodiment, the central log manager 110 tracks IoT apparatus locations on the network 199, and in another embodiment, tracks user locations on the network 199 based on log data from events. From historical locations, the trends can be determined relative to a current location.

If the current location violates security rules, the security server 112 can notify network administrators or security personnel, depending upon the circumstances. For example, a user that is always logging into the system through a laptop computer, but then breaks that trend by logging into the system through a smartphone. In another example, a user previously located in California 5 minutes ago, should not be currently located in Russia. In still another example, a stationary item such as a refrigerator which are expected to stay in the same location, should not change locations at all. The security server 112 can implement network security or physical device security. In other embodiments, the security server 112 can be substituted or flanked by different types of servers that implement different rule-based management of identities and locations, such as a lost pet server, an inventory management server, or a supply chain management server. These servers can be integrated with the central log manager as applications or reside on a separate server connected to the network 199, even operated by a separate entity.

The central log manager 110 merges log data from multiple different events to develop a user context for identification. Thus, the user context is updated by cross-correlating various information from events because identification attributes are different for different events. In particular, DHCP logs provide IP address, MAC address and host name, but not a user. Active Directory authentication logs provide IP address, user and location but not host name or MAC address. Wireless LAN logs provide MAC address, user and location but not host name. Router layer 2 or 3 forwarding tables provide MAC address and location, but no IP address, host name or user. In an embodiment, names of users and IoT apparatus are stored on a database along with user names for different services (e.g., a VPN user name is correlated to a legal name). Example event types include a Windows or Unix logon event, an Active Directory logon event, a layer 2 forwarding table event, a layer 3 routing table event, a firewall event, a DHCP log event, a VPN authentication event, a VOIP phone event, and a wireless LAN event. A name used for one of the events can be cross-references with a database storing an actual name of a user. IoT apparatus can be identified by serial number, UPC number, inventory ID, or the like. Many variations are possible, some of which are shown below with respect to FIG. 5.

In still another embodiment, the central log manager 110 selectively updates database records use store location information to conserve resources.

The central log manager 110 can on the same LAN or be outside of a firewall. The central log manager 110 can be a FortiSIEM device by Fortinet, Inc. of Sunnyvale, Calif., in one embodiment. Additional example embodiments of the central log manager 110 are discussed below in relation to FIG. 2.

The collector nodes 120A-B are geographically dispersed data collectors that are located proximate to the underlying network devices 130A-D, in some embodiments. The collector nodes 120A-B can be connected to the network devices 130A-D on a LAN, or the collector nodes 120A-B can be cloud-based or otherwise exist outside of a firewall on a LAN. The collector nodes 120A-B can be on a common LAN or on different LANs. In some aspects, events are pushed to the collector nodes 120A-B. In other aspects, the collect nodes 120A-B are notified by other devices of errors, such as by a wireless station attempting to connect. In another aspect, the collector nodes 120A-B perform test transactions against the network devices 130A-D and report errors in event records.

In the example of FIGS. 1A-1B, collector node 120A services one network device while collector node 120B has a higher device count of three network devices. The network device 130A could be a gateway that generates lots of event records while network devices 130B-D are rarely used. Non-critical devices may create less event reporting than a single device. Many variations are possible The network devices 130A-D can be, for example, a gateway device, a firewall, an access point, a switch, a router, a hub, a repeater, a server, a controller, a wireless station, or any other device on the network 199 or within a LAN. The network devices 130A-D can be implemented in a personal computer, a laptop computer, a tablet computer, a smart phone, a mobile computing device, a server, a cloud-based device, a virtual device, an Internet appliance, or any of the computing devices described herein (see e.g., FIG. 7). No client configuration or download is needed for this particular technique, although other aspects of log management may require downloads to the network devices 130A-D. For instance, an operating system patch or separate application can detect error events through intercepting messages, and collect data for sending to the collector nodes 120A-B.

Network 199 provides a data channel for components of the system 100. Specifically, the network device 130A is coupled to the collector node 120A and the network devices 130B-D are coupled to the collector node 120B, through wired or wireless channels. In, turn, the collector nodes 120A-B are coupled to the WAN 199 preferably through a wired connection, but can be wireless. The central log manager 110 is also coupled to the WAN 199, preferably through a wired connection. Additional network components can also be part of the system 100, such as firewalls, virus scanners, routers, switches, application servers, databases, and the like.

Figure 7:
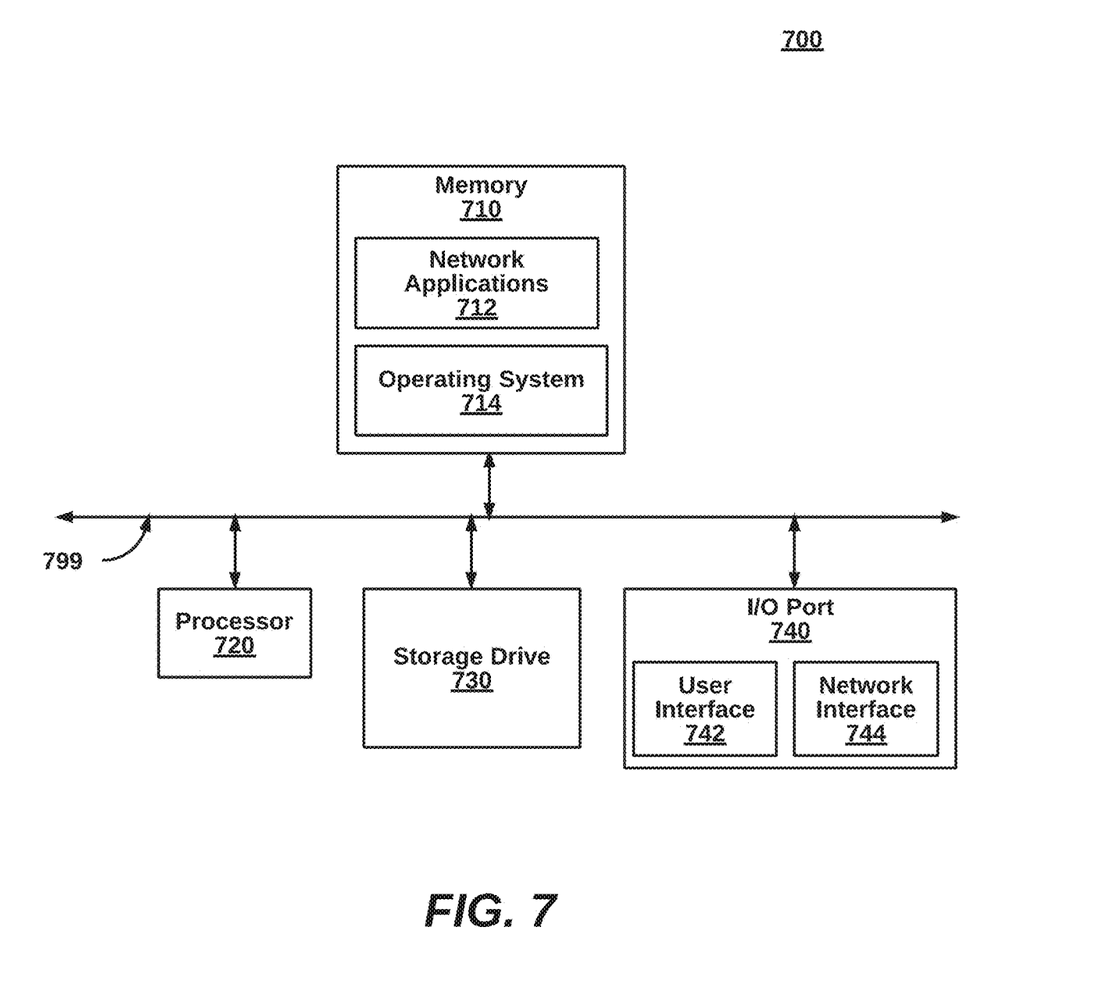
FIG. 7 is a block diagram illustrating an example computing device, according to one embodiment.

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 7).

FIG. 2 is a more detailed block diagram illustrating the central log manager 110 of the system 100, according to one embodiment. The central log manager 110 comprises a IoT and user tracking module 210, a trend identification module 220, a security breach module 230, a lazy update module 240, a fast update module 250, and an IoT and user database 260. The components can be implemented in hardware, software, or a combination of both.

The IoT and user tracking module 210 maintains a location history for individual IoT apparatus and for specific users in the IoT and user database 260. For example, a table or relational database record can list time and data stamps, per location, for each individual user. The stored data can be pre-processed in the collector node 120 to conserve computing resources of the central log manager 110. As such, the received data has been processed from log data in order to extract appropriate metadata. Some embodiments, perhaps when serving fewer network devices, process log data locally.

The trend identification module 220 analyzes historical locations to determine whether or not a current location is an anomaly. Conditions for anomaly determinations can be expressed in one or more rule sets. One rule set describes conditions that in aggregate, or individually, indicate a security breach.

The security breach module 230 applies rules to determine whether a security breach is suspected. The rules can apply to impossible changes in location, for example. An inventory management system can recognize a theft by tracking equipment to an area restricted by rules. In some cases, the rules are default rules that are preconfigured. In other cases, the rules are customizable. A user interface allows high level commands to be entered by a manager. High level source coding or just Boolean logic provide various options for implementing rules.

Once suspicious activity has been identified by the security breach module 230, a security action can be performed. For instance, a user can be presented with additional login credentialing questions. Another instance notifies security of a theft. An additional instance raises security on the network as a whole. Numerous variations are possible.

The lazy update module 240 selectively updates the use database 260 only if relevant metadata has changed for a user or device in order to conserve resources. Redundant data is quickly identified and eliminated.

The fast update module 250 selectively updates the use database 250 as soon as any change in relevant metadata is observed like an access point or location change. Additionally, the IoT and user database 260 can store tables that correlate official names against user names (e.g., Jazzmin Ramirez legal employee name known to a company correlated to jramirez, the user name for Active Directory or other services).

The IoT and user database 260 stores location information about IoT apparatus and/or specific users. Some embodiments use a remote database physically separate from the central log manager 110. The IoT and user database 260 can be subject to online storage processes, including data compression, data security, and data mirroring.

FIG. 3 is a more detailed block diagram illustrating a collector node 120 (collectively representing the collector nodes 120A-B) of the system 100, according to one embodiment. The collector node 120 comprises an event processor 310, a user identity module 320, and a user location module 330. The internal components can be implemented in hardware, software, or a combination of both.

The event processor 310 parses event logs. A queue can store incoming events in a first come, first out, basis. High priority events skip ahead in the queue, in some implementations. Some events are deleted without being queued. Some embodiments of the event processor 310 include the functionality of the user identity module 320 and a user location module 330 as sub-modules.

The IoT and user identity module 320 analyzes the metadata for reported events to identify an IoT device or an individual user. While conventional systems are geared towards identifying a problem, the IoT and user identity module 320 is unconcerned with the issue. Instead, the IoT and user identity module 320 is geared towards who had the problem, and the user location module 330 is geared towards where the problem occurred.

Figure 5:
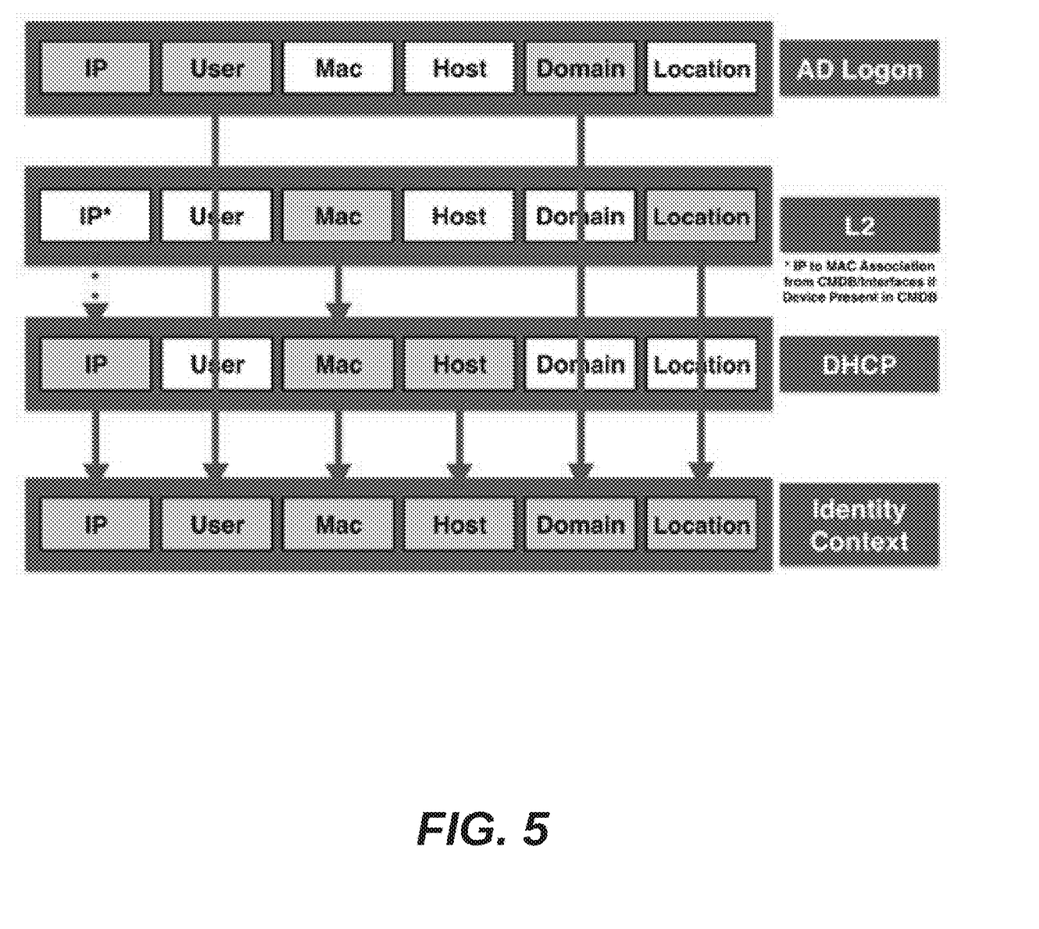
FIG. 5 is a more detailed block diagram illustrating an example of the step of location tracking based on log data and events from the method of FIG. 4, according to one embodiment.

To this end, FIG. 5 shows that different log events having specific metadata that is added to an identity context. The Active Directory logon has an IP address, user, and domain, but not a MAC address, host address or location. The layer 2 routing table has a MAC address and a location, but not an IP address, a user, a host or a domain. Finally, the DHCP event metadata has an IP address, a MAC address and a host, but not a user, a domain or a location. In the aggregate, an identity context is generated by merging data fields from different types of data for a more complete picture. Then subsequent events are matches up to the record for location updates.

The user location module 330 tracks the location field to determine a location. If an explicit location is not provided, inference can be made.

Figure 4:
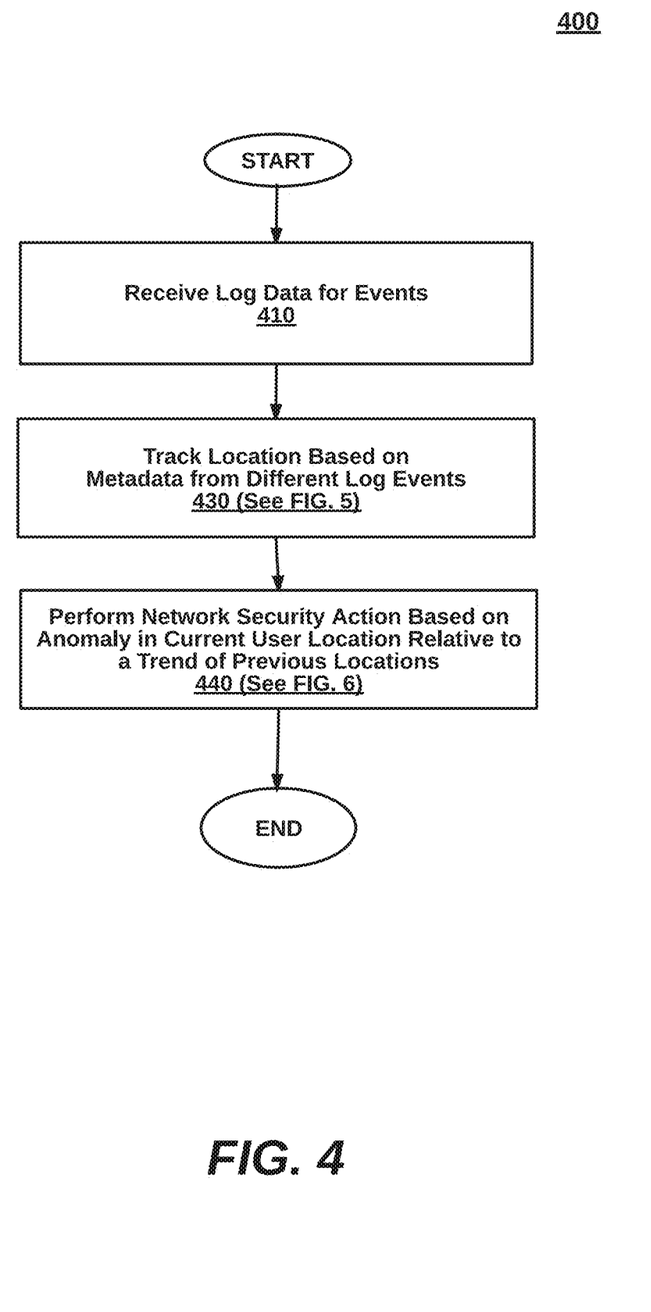
FIG. 4 is a high-level flow diagram illustrating a method for tracking IoT apparatus and users from reported log event, according to one embodiment.
Figure 6:
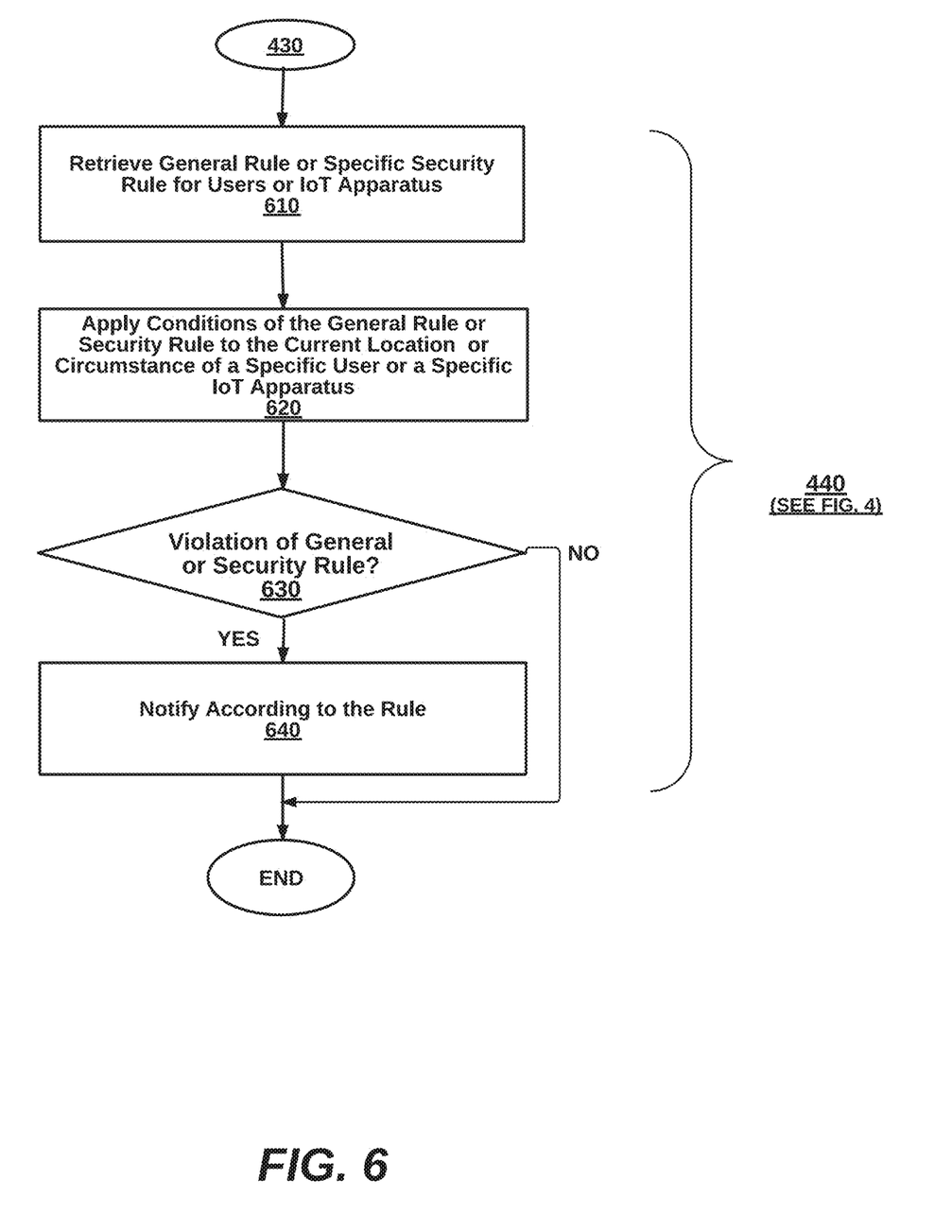
FIG. 6 is a more detailed flow diagram illustrating a step of performing network security actions based on location anomalies from the method of FIG. 4, according to one embodiment.

Methods for Dynamically Tracking Users and Devices of Log Events (FIGS. 4-6)

FIG. 4 is a high-level flow diagram illustrating a method 400 for tracking of users and devices at collector nodes, according to one embodiment. The method 400 can be implemented by the system 100 of FIGS. 1A-1B or a different system. One of ordinary skill in the art will recognize that the method 400 is non-limiting as other embodiments can have more or less steps and can be performed in a different order.

At step 410, log data for events is received (e.g., by a controller node). At step 420, location is tracked based on metadata from different log events (e.g., by a controller mode and/or a central log manager). An identity is determined from one or more events as shown in FIG. 5. An identity context is constructed by storing an aggregate of different metadata from different events, and locations from different events at different times are stored in association with the identity context. Location history is tracked by retrieving previous location determinations for a specific user or IoT apparatus. The history can reveal a trend or profile. At step 430, a network security action is performed based on an anomaly in a current user location relative to a trend of previous locations (e.g., by a security server). For instance, a statistical analysis model can predict future locations, and if a current location falls below a threshold level for likely locations, an anomaly is identified. Additionally, rules can be set to restrict allowable locations (or other allowable circumstances revealed by log data or log metadata).

FIG. 6 is a more detailed flow diagram illustrating a step 440 of performing network security actions based on location anomalies from the method of FIG. 4, according to one embodiment.

At step 610, a general rule or a specific security rule (or other type of rule or rules) is retrieved for a specific or a type of users, or for a specific or a type of IoT apparatus. At step 620, conditions of the rule are applied to the current location of circumstance of a specific user or a specific IoT apparatus. At step 630, if there is a violation of the rule due, at step 640, notifications (or other actions) are performed.

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the central log manager 110, the collector nodes 120, and the network devices 130A-D. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of the central log manager 110, the collector nodes 120, and the network devices 130A-D, as illustrated in FIGS. 1-3. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x74 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX74. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730.

The storage drive 730 can be any non-volatile type of storage such as a magnetic disc, EEPROM (electronically erasable programmable read-only memory), Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for a log management server on a data communication network for identifying and tracking users and IoT (Internet of Things) devices from event reporting data, the method comprising:

receiving metadata for different log events, from a plurality of controller nodes, geographically-dispersed around the data communication network for proximity to network devices, the log events being reported by the network devices to the plurality of controller nodes;

parsing the metadata for each of the reported log events to expose parts of user identity context, wherein the metadata from more than one of the different log events is merged to form a completed user identity context for a specific user;

identifying the specific user and a specific IoT device based on user identity aspects of the user identity context of the log events;

determining a current location for the specific user based on user location attributes of the completed user identity context;

detecting a merge condition based on isolating a part of the user identity context from one of the different log events for the specific user that is distinct from the completed user identity context currently associated with the specific user from past log events matched to the specific user;

merging the isolated part of the user identity context from one of the different log events with the user identity context from the past log events responsive to the merge condition detection;

comparing the determined current location for the specific user to a trend of previously determined user locations for the specific user stored in relation to previous reported events; and responsive to identifying an anomaly in one of the different log events based on the determined current location relative to the trend of previously determined user locations, performing a network security action concerning the specific user, wherein identifying the anomaly in one of the different log events based on the determined current location comprises retrieving and applying a rule associated with the specific user, the rule restricting allowable locations for the specific IoT device.

2. The method of claim 1, wherein the metadata comprises at least one of: a Windows or Unix logon event, an Active Directory logon event, a layer 2 forwarding table event, a layer 3 routing table event, a firewall event, a DHCP log event, a VPN authentication event, a VOIP phone event, and a wireless LAN event.

3. The method of claim 2, wherein the parsed metadata comprises at least one of a source IP address, a source MAC address, a source device name, a host IP address, a host MAC address, a host name, a domain user, a VPN user, and an AAA authenticated user.

4. The method of claim 1, further comprising:
receiving a list of the previously determined user locations; and
determining the trend of previously determined user locations.

5. The method of claim 1, further comprising:
determining the previously determined user locations from previously received log data for events; and
determining the trend of previously determined user locations.

6. The method of claim 1, further comprising:
fast updating a user context database responsive to receiving metadata that matches predefined fast update rules for the specific user and the specific IoT device.

7. The method of claim 1, wherein at least one of the different log events occurring at the plurality of controller nodes concern the specific user.

8. The method of claim 1, identifying the anomaly in a current IoT device location comprises:
retrieving the rule associated with the specific user, the rule restricting allowable devices that can be associated with the specific user.

9. The method of claim 1, wherein identifying the anomaly in the current location of the specific user comprises:
retrieving the rule associated with the specific user, the rule restricting allowable events for the specific user.

10. The method of claim 1, wherein the log management server comprises an SIEM (security information and event management) server.

11. A non-transitory computer-readable medium to, when executed by a processor, perform a computer-implemented method in a log management server on a data communication network for identifying and tracking users and IoT (Internet of Things) devices from event reporting data, the method comprising:

receiving metadata for different log events, from a plurality of controller nodes, geographically-dispersed around the data communication network for proximity to network devices, the log events being reported by the network devices to the plurality of controller nodes;

parsing the metadata for each of the reported log events to expose parts of user identity context, wherein the metadata from more than one of the different log events is merged to form a completed user identity context for a specific user;

identifying the specific user and a specific IoT devices based on user identity aspects of the user identity context of the log events;

determining a current location for the specific user based on user location attributes of the completed user identity context;

detecting a merge condition based on isolating a part of the user identity context from one of the different log events for the specific user that is distinct from the completed user identity context currently associated with the specific user from past log events matched to the specific user;

merging the isolated part of the user identity context from one of the different log events with the user identity context from the past log events responsive to the merge condition detection;

comparing the determined current location for the specific user to a trend of previously determined user locations for the specific user stored in relation to previous reported events; and responsive to identifying an anomaly in one of the different log events based on the determined current location relative to the trend of previously determined user locations, performing a network security action concerning the specific user, wherein identifying the anomaly in one of the different log events based on the determined current location comprises retrieving and applying a rule associated with the specific user, the rule restricting allowable locations for the specific IoT device.

12. A system with a log management server on a data communication network for identifying and tracking users and IoT (Internet of Things) devices from event reporting data, the log management server comprising:
a processor;
a storage, coupled to the processor; and
a communication interface device, coupled to the processor and coupled to data communication network, to receive metadata for different log events, from a plurality of controller nodes, geographically-dispersed around the data communication network for proximity to network devices, the log events being reported by the network devices to the plurality of controller nodes, wherein the processor parses the metadata for each of the reported log events to expose parts of user identity context, wherein the metadata from more than one of the different log events is merged to form a completed user identity context for a specific user, wherein the processor identifies the specific user and a specific IoT device based on user identity aspects of the user identity context of the log events, wherein the processor determines a current location for the specific user based on user location attributes of the completed user identity context wherein the processor detects a merge condition based on isolating a part of the user identity context from one of the different log events for the specific user that is distinct from the completed user identity context currently associated with the specific user from past log events matched to the specific user, wherein the processor merges the isolated part of the user identity context from one of the different log events with the user identity context from the past log events responsive to the merge condition detection, wherein the processor compares the determined current location for the specific user to a trend of previously determined user locations for the specific user stored in relation to previous reported events, wherein the processor, responsive to identifying an anomaly in one of the different log events based on the determined current location relative to the trend of previously determined user locations, performs a network security action concerning the specific user, and wherein identifying the anomaly in one of the different log events based on the determined current location comprises retrieving and applying a rule associated with the specific user, the rule restricting allowable locations for the specific IoT device.

* * * * *